United States Patent
Wagoner et al.

(10) Patent No.: US 10,027,240 B1
(45) Date of Patent: Jul. 17, 2018

(54) GROUND FAULT ISOLATION FOR POWER CONVERTERS WITH SILICON CARBIDE MOSFETS

(71) Applicant: General Electric Company, Schenectady, NY (US)

(72) Inventors: Robert Gregory Wagoner, Roanoke, VA (US); Govardhan Ganireddy, Bangalore (IN); Saurabh Shukla, Clifton Park, NY (US); Ravisekhar Nadimpalli Raju, Clifton Park, NY (US); Harold Robert Schnetzka, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/399,817

(22) Filed: Jan. 6, 2017

(51) Int. Cl.
| | |
|---|---|
| *H02M 5/458* | (2006.01) |
| *H02M 1/084* | (2006.01) |
| *H02M 1/12* | (2006.01) |
| *H02H 7/12* | (2006.01) |
| *H05K 7/20* | (2006.01) |
| *H02M 1/00* | (2006.01) |

(52) U.S. Cl.
CPC .......... *H02M 5/458* (2013.01); *H02H 7/1216* (2013.01); *H02M 1/084* (2013.01); *H02M 1/12* (2013.01); *H05K 7/20445* (2013.01); *H02M 2001/0009* (2013.01)

(58) Field of Classification Search
CPC .......... H02P 9/305; H02P 23/26; H02P 9/007; H02P 27/06; Y02E 10/725; H02H 3/16
USPC ....... 290/4 C, 4 R, 40 R, 43, 44; 363/95, 97, 363/131, 132, 37, 89
See application file for complete search history.

(56) References Cited

U.S. PATENT DOCUMENTS

| | | | |
|---|---|---|---|
| 5,638,263 A | 6/1997 | Opal et al. | |
| 5,986,909 A | 11/1999 | Hammond et al. | |
| 6,222,284 B1 | 4/2001 | Hammond et al. | |
| 7,568,931 B2 | 8/2009 | Hammond | |
| 7,679,994 B2 * | 3/2010 | Ronnekleiv | G01D 5/35383 181/110 |
| 7,787,270 B2 * | 8/2010 | NadimpalliRaju | H02J 4/00 363/37 |

(Continued)

FOREIGN PATENT DOCUMENTS

| | | |
|---|---|---|
| CN | 103219738 A | 7/2013 |
| EP | 3051680 A1 | 8/2016 |

(Continued)

*Primary Examiner* — Rajnikant Patel
(74) *Attorney, Agent, or Firm* — Dority & Manning, P.A.

(57) ABSTRACT

Systems and methods for grounding power generation units with silicon carbide MOSFET power converters are provided. A power generation unit can include a power generator configured to generate multiphase alternating current power at a first voltage. The power generation unit can also include a power converter configured to convert the multiphase alternating current power from the power generator at the first voltage to multiphase alternating current power at a second voltage. The power converter can include one or more silicon carbide MOSFETs and at least one heatsink configured to remove heat from the power converter. The at least one heatsink of the power converter can be electrically connected to a local ground formed by one or more components of the power generation unit.

20 Claims, 5 Drawing Sheets

(56) References Cited

U.S. PATENT DOCUMENTS

| | | | |
|---|---|---|---|
| 7,800,254 B2 | 9/2010 | Hammond | |
| 8,008,923 B2 | 8/2011 | Hammond | |
| 8,093,764 B2 | 1/2012 | Hammond | |
| 8,207,812 B2 | 6/2012 | Roc et al. | |
| 8,441,147 B2 | 5/2013 | Hammond | |
| 8,644,037 B2 * | 2/2014 | Raju | H02M 5/458 |
| | | | 363/37 |
| 8,885,373 B1 | 11/2014 | Valiani et al. | |
| 8,988,860 B2 | 3/2015 | Hammond | |
| 9,048,694 B2 | 6/2015 | Pan et al. | |
| 9,277,683 B2 | 3/2016 | Ionescu et al. | |
| 9,577,421 B2 * | 2/2017 | Barker | H02H 3/16 |
| 2013/0147201 A1 * | 6/2013 | Roesner | H01F 38/18 |
| | | | 290/55 |
| 2015/0070939 A1 | 3/2015 | Gupta et al. | |
| 2015/0171766 A1 | 6/2015 | Valiani et al. | |
| 2015/0210506 A1 * | 7/2015 | Kattainen | H02H 3/165 |
| | | | 187/289 |
| 2015/0349688 A1 * | 12/2015 | Wagoner | H02P 9/007 |
| | | | 290/44 |
| 2016/0079879 A1 | 3/2016 | Ronner | |

FOREIGN PATENT DOCUMENTS

| | | |
|---|---|---|
| WO | WO 2015/110185 A1 | 7/2015 |
| WO | WO 2016/120335 A1 | 8/2016 |

\* cited by examiner

GROUND FAULT ISOLATION FOR POWER CONVERTERS WITH SILICON CARBIDE MOSFETS

FIELD

The present subject matter relates generally to power systems, and more particularly to systems and methods for grounding and isolating ground faults in a power system including power converters utilizing silicon carbide MOSFETs.

BACKGROUND

Power generation systems can use power converters to convert power into a form of power suitable for an energy grid. In a typical power converter, a plurality of switching devices, such as insulated-gate bipolar transistors ("IGBTs") or metal-oxide-semiconductor field effect transistors ("MOSFETs") can be used in electronic circuits, such as half bridge or full-bridge circuits, to convert the power. Recent developments in switching device technology have allowed for the use of silicon carbide ("SiC") MOSFETs in power converters. Using SiC MOSFETs allows for operation of a power converter at a much higher switching frequency compared to conventional IGBTs.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a power generation unit. The power generation unit can include a power generator configured to generate multiphase alternating current power at a first voltage. The power generation unit can also include a power converter configured to convert the multiphase alternating current power from the power generator at the first voltage to multiphase alternating current power at a second voltage. The power converter can include one or more silicon carbide MOSFETs and at least one heatsink configured to remove heat from the power converter. The at least one heatsink of the power converter can be electrically connected to a local ground formed by one or more components of the power generation unit.

Another example aspect of the present disclosure is directed to a method of isolating a ground fault in a power generation system. The power generation system can include a plurality of power generation units. Each power generation unit can include a power generator configured to generate multiphase alternating current power at a first voltage and a power converter configured to convert the multiphase alternating current power from the power generator at the first voltage to multiphase alternating current power at a second voltage. Each power converter can include one or more silicon carbide MOSFETs and at least one heatsink configured to remove heat from the power converter. The at least one heatsink of each power converter can be electrically connected to a local ground formed by one or more components of the power generation unit. The method can include receiving, by one or more control devices, one or more signals indicative of a current between a power converter and a local ground in a power generation unit from one or more sensors in the power generation system. The method can further include determining, by the one or more control devices, whether a fault has occurred based at least in part on the one or more signals indicative of a current between the power converter and the local ground in a power generation unit. When the one or more control devices have determined a fault has occurred, the method can further include identifying a faulted power generation unit. The method can further include electrically isolating the faulted power generation unit.

Another example aspect of the present disclosure is directed to power generation system. The power generation system can include a plurality of power generation units and one or more control devices. Each power generation unit can include a power generator configured to generate multiphase alternating current power at a first voltage. Each power generation unit can also include a power converter configured to convert the multiphase alternating current power from the power generator at the first voltage to multiphase alternating current power at a second voltage. The power converter can include one or more silicon carbide MOSFETs and at least one heatsink configured to remove heat from the power converter. The at least one heatsink of each power converter can be electrically connected to a local ground formed by one or more components of the power generation unit. The one or more control devices can be configured to determine when a ground fault has occurred in a power converter in the power generation system based at least in part on a current from the at least one heatsink to the local ground in a power generation unit.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for grounding and isolating a ground fault in a power generation system utilizing power converters with SiC MOSFETs. For example, power generation systems, such as systems using doubly fed induction generators ("DFIGs") as power generation units, can use one or more power converters to convert power from a low voltage multiphase alternating current power into a medium voltage multiphase alternating current power. A plurality of power generation units, such as DFIGs, can be arranged in a cluster, and can together feed power to a common transformer ("cluster transformer"). The cluster transformer can step up the medium voltage power into a higher voltage power suitable for transmission over one or more power transmission lines.

However, occasionally ground faults can occur in these power converters, such as when an insulation failure occurs. In some configurations, when a ground fault occurs in a power converter, the ground fault may propagate to the cluster transformer, and a ground fault protection scheme for the cluster may be triggered, thereby tripping the entire cluster off-line. In such configurations, a ground fault in an individual power converter associated with a single power generation unit can cause all power generation units in a power generation system to be tripped off-line. This can reduce the availability and power output of the entire power generation system. Further, when such a ground fault occurs, the location of the ground fault may be difficult to detect and isolate, thereby potentially requiring extensive maintenance periods and system down-time.

Example aspects of the present disclosure are directed to systems and methods of grounding a power generation unit and/or power converter to ground a fault current in a power converter, such as a fault current due to an insulation failure. For example, the systems and methods can ground a medium voltage ("MV") side of the power generation unit and/or power converter. As used herein, "MV" power can be power greater than about 1.5 kilovolts and less than about 100 kilovolts. As used herein, the term "about" can mean within 20% of the stated value. For example, the power generation system can include a plurality of power generation units. Each power generation unit can include a power generator, such as a DFIG, which can be configured to generate multiphase alternating current power at a first voltage, such as a low voltage ("LV") power. As used herein, "LV" power can be a power less than about 1.5 kilovolts. Each power generation unit can also include a power converter comprising one or more SiC MOSFETs and at least one heatsink configured to remove heat from one or more components of the power converter. The power converter can be configured to convert the multiphase alternating current power from the power generator at the first voltage to multiphase alternating current power at a second voltage, such as by converting LV AC power to MV AC power. The at least one heatsink of each power converter can be electrically connected to a local ground formed by one or more components of the power generation unit. The local ground can be specific to a power generation unit, and can be at a reference or non-zero voltage level. The power generation unit and/or system can further include a control device, which can be configured to determine when a ground fault has occurred in a power converter.

In an embodiment, when a ground fault has occurred in a power converter in the power generation unit or power generation system, the control device can further be configured to determine in which power generation unit the ground fault occurred. For example, a control device can be configured to receive one or more signals indicative of a current between a power converter and a local ground in a power generation unit. The control device can further be configured to determine whether a fault has occurred by, for example, comparing the current to a threshold. If, for example, the current exceeds the threshold, the control device can determine that a ground fault has occurred. Further, the control device can be configured to identify a faulted power generation unit, such as a power generation unit which includes a power converter that has experienced a ground fault. Further, the control device can be configured to electrically isolate the faulted power generation unit, such as, for example, by disconnecting the faulted power generation unit from the power generation system by opening one or more switches.

For example, a power generation system can include a plurality of DFIGs, wherein each DFIG is coupled to a power converter. The power output from each power converter can be collected by a cluster network, which can be configured to deliver the combined output of the power converters to a cluster transformer. The cluster transformer can be electrically connected to the plurality of power generation units in the power system, such as by connecting to the cluster network, and can be configured to convert the power from each power generation unit from a first form of power to a second form of power. For example, the cluster transformer can be a three winding transformer configured to convert the MV power from a cluster of DFIGs into a high voltage ("HV") power suitable for transmission over an electric grid transmission system. As used herein, HV power can be a power greater than about 100 kilovolts. In one or more embodiments, the cluster transformer can be electrically connected to a ground. For example, a cluster transformer can be a neutral forming transformer, such as a transformer in a star or zigzag configuration. The neutral of the cluster transformer can be electrically connected to a ground, such as, for example, by a solid earth ground. In an embodiment, the cluster transformer can be high impedance grounded, such as by electrically connecting a high impedance resistor to the neutral of the cluster transformer and a ground. The high impedance resistor can be, for example, a resistor selected to carry a fault current associated with the cluster transformer.

In an embodiment, each power generation unit can further include a multiphase filter electrically connected to the power output of the power converter in the power generation unit. For example, each multiphase filter can be configured to remove one or more harmonics from the power output of the associated power converter in order to condition the power output to meet certain power quality standards. Each multiphase filter can include, for example, one or more inductors and a capacitor. In an embodiment, the filter capacitors for each phase of the multiphase filter can be electrically connected to form a neutral node. For example, a power converter can be a three-phase power converter, and a multiphase filter can include at least one inductor and a capacitor for each of the three phases. The three filter capacitors can be electrically connected together to form a neutral node. In an embodiment, the at least one heatsink of each power converter can be electrically connected to a local ground by electrically connecting the at least one heatsink to the neutral node. For example, one or more grounding conductors can be connected between one or more heatsinks in a power converter and the neutral node formed by the filter capacitors in a multiphase filter.

In an embodiment, each power converter can include a plurality of DC to DC to AC inverter blocks. For example, each DC to DC to AC inverter blocks can include a plurality of SiC MOSFETs connected in one or more bridge circuits. Further, each DC to DC to AC inverter block can include an isolation transformer configured to step up a LV power from the power generator to a MV power. In an embodiment, each isolation transformer can include a transformer heatsink. For example, the core of the isolation transformer can be configured to dissipate heat from the isolation transformer. In an embodiment, the transformer heatsink of the isolation transformer can be electrically connected to a local ground, such as a neutral node formed by the filter capacitors of a multiphase filter. Further, each DC to DC to AC inverter block can further include a first conversion entity configured to convert DC power to AC power, a second conversion entity configured to convert AC power to DC power, and a third conversion entity configured to convert DC power to AC power. The isolation transformer can be coupled between the first conversion entity and the second conversion entity. The second conversion entity and the third conversion entity can include a converter heatsink. In an embodiment, the converter heatsink can be electrically connected to a local ground, such as a neutral node formed by the filter capacitors of a multiphase filter. Other local grounds can similarly be used to ground the heatsinks in a power converter.

In this way, the systems and methods according to example aspects of the present disclosure can have a technical effect of grounding a power system including a power converter utilizing SiC MOSFETs. Further, the systems and methods according to example aspects of the present disclosure can allow for the identification and isolation of the faulted power generation unit and/or faulted power converter, thereby allowing for a power generation unit which includes a faulted power converter to be electrically isolated from other power generation units in the power generation system. For example, the systems and methods according to example aspects of the present disclosure can allow for an individual power generation unit, such as a DFIG and an associated power converter, to be electrically isolated from other power generation units in the power generation system, thereby preventing fault propagation to a cluster transformer. This can allow for increased availability of the unaffected power generation units in a power generation system, while protecting components in an individual power generation unit.

Figure 1:
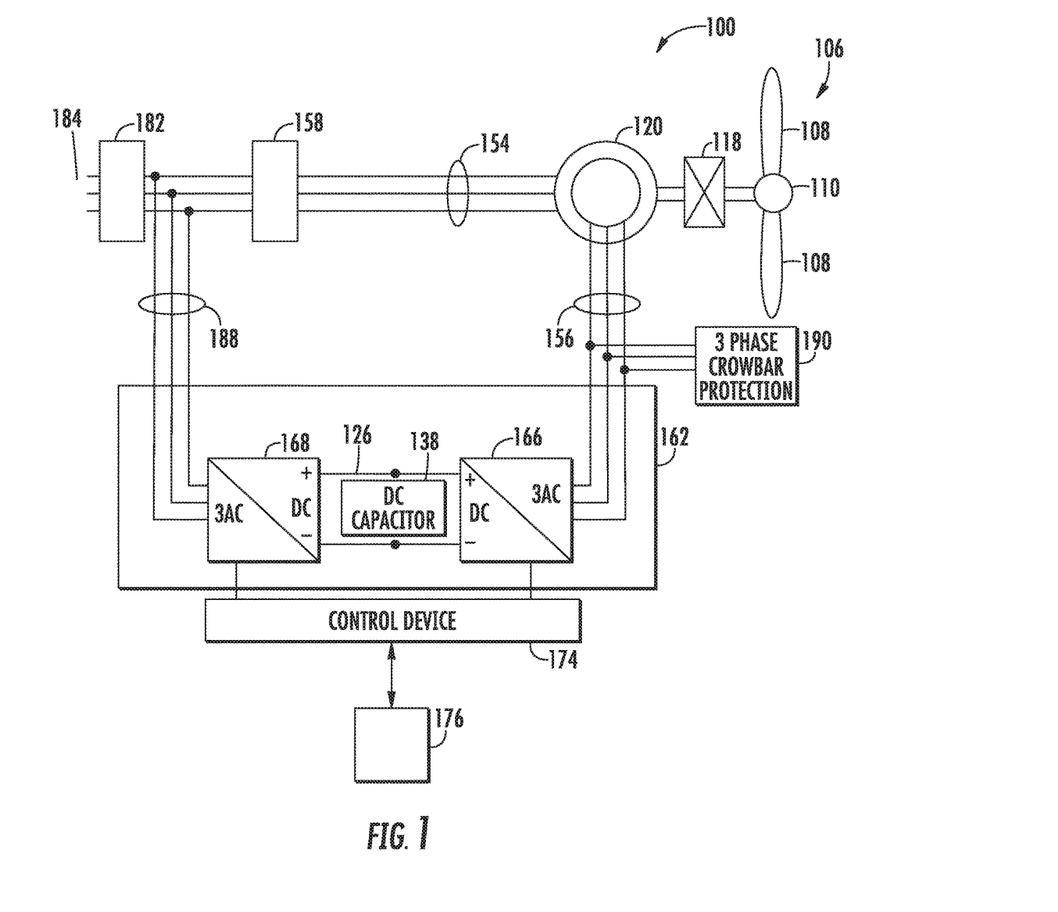
FIG. 1 depicts an example power generation unit.

With reference now to the figures, example aspects of the present disclosure will be discussed in greater detail. FIG. 1 depicts a power generation unit 100 according to example aspects of the present disclosure, which includes a DFIG 120. The present disclosure will be discussed with reference to the example power generation unit 100 of FIG. 1 for purposes of illustration and discussion. Those of ordinary skill in the art, using the disclosures provided herein, should understand that aspects of the present disclosure are also applicable in other systems, such as full power conversion wind turbine systems, solar power systems, energy storage systems, and other power systems.

In the example power generation unit 100, a rotor 106 includes a plurality of rotor blades 108 coupled to a rotating hub 110. In the example power generation unit 100, an optional gear box 118 can be coupled to a generator 120. In accordance with aspects of the present disclosure, the generator 120 is a doubly fed induction generator (DFIG) 120.

DFIG 120 is typically coupled to a stator bus 154 and a power converter 162 via a rotor bus 156. The stator bus provides an output multiphase power (e.g. three-phase power) from a stator of DFIG 120 and the rotor bus 156 provides an output multiphase power (e.g. three-phase power) of DFIG 120. The power converter 162 can be a bidirectional power converter configured to provide output power to a power delivery point 184 and/or to receive power from the power delivery point 184. The power delivery point 184 can be, for example, a grid or a cluster network, as described herein. As shown, DFIG 120 is coupled via the rotor bus 156 to a rotor side converter 166. The rotor side converter 166 is coupled to a line side converter 168 which in turn is coupled to a line side bus 188. An auxiliary power feed (not depicted) can be coupled to the line side bus 188 to provide power for components used in the wind turbine system, such as fans, pumps, motors, and other components of the wind turbine system.

In example configurations, the rotor side converter 166 and/or the line side converter 168 are configured for normal operating mode in a three-phase, pulse width modulation (PWM) arrangement using SiC MOSFETs and/or IGBTs as switching devices. SiC MOSFETs can switch at a very high frequency as compared to conventional IGBTs. For example, SiC MOSFETs can be switched at a frequency from approximately 0.01 Hz to 10 MHz, with a typical switching frequency of 1 KHz to 400 KHz, whereas IGBTs can be switched at a frequency from approximately 0.01 Hz to 200 KHz, with a typical switching frequency of 1 KHz to 20 KHz. Additionally, SiC MOSFETs can provide advantages over ordinary MOSFETs when operated in some voltage ranges. For example, in power converters operating at 1200V-1700V on the LV side, SiC MOSFETs have lower switching and conduction losses than ordinary MOSFETs.

In some implementations, the rotor side converter 166 and/or the line side converter 168 can include a plurality of conversion modules, each associated with a an output phase of the multiphase power, as will be discussed in more detail with respect to FIGS. 2 and 3. The rotor side converter 166 and the line side converter 168 can be coupled via a DC link 126 across which can be a DC link capacitor 138.

In some embodiments, the DC link 126 can include a dynamic brake (not shown). The dynamic brake can include a switching element (e.g., an IGBT) coupled in series with a dissipative element (e.g., a resistor). The switching element can be controlled using pulse width modulation techniques via one or more control devices (e.g., controller 174 or control system 176) to control the voltage on the DC link 126.

In some embodiments, the DC link 126 can include a plurality of resistors (e.g., two resistors) coupled in series between the positive and negative bus. A ground can be coupled at a midpoint between the resistors.

The power converter 162 can be coupled to a control device 174 to control the operation of the rotor side converter 166 and the line side converter 168. It should be noted that the control device 174, in typical embodiments, is configured as an interface between the power converter 162 and a control system 176.

In operation, power generated at DFIG 120 by rotating the rotor 106 is provided via a dual path to power delivery point 184. The dual paths are defined by the stator bus 154 and the rotor bus 156. On the stator bus 154 side, sinusoidal multiphase (e.g. three-phase) is provided to the power delivery point (e.g., grid or cluster network). In particular, the AC power provided via the stator bus 154 can be a medium voltage ("MV") AC power. On the rotor bus side 156, sinusoidal multiphase (e.g. three-phase) AC power is provided to the power converter 162. In particular, the AC power provided to the power converter 162 via the rotor bus 156 can be a low voltage ("LV") AC power. The rotor side power converter 166 converts the LV AC power provided from the rotor bus 156 into DC power and provides the DC power to the DC link 126. Switching devices (e.g. SiC MOSFETs and/or IGBTs) used in parallel bridge circuits of the rotor side power converter 166 can be modulated to convert the AC power provided from the rotor bus 156 into DC power suitable for the DC link 126. Such DC power can be a LV DC power.

In a power generation unit 100, the power converter 162 can be configured to convert the LV AC power to MV AC power. For example, the line side converter 168 can convert the LV DC power on the DC link 126 into a MV AC power suitable for the power delivery point 184. In particular, SiC MOSFETs used in bridge circuits of the line side power converter 168 can be modulated to convert the DC power on the DC link 126 into AC power on the line side bus 188. SiC MOSFETs can be operated at a higher switching frequency than conventional IGBTs. In addition, one or more isolation transformers coupled to one or more of the bridge circuits can be configured to step the voltage up to the MV voltage. The MV AC power from the power converter 162 can be combined with the MV power from the stator of DFIG 120 to provide multiphase power (e.g. three-phase power) having a frequency maintained substantially at the frequency of the power delivery point 184 (e.g. 50 Hz/60 Hz). In this manner, the MV line side bus 188 can be coupled to the MV stator bus 154 to provide such multiphase power. In an embodiment, a plurality of power generation units can be included in a power generation system, which can include a cluster network configured to receive the MV AC power from each power generation unit and provide the MV AC power to a cluster transformer, as described herein.

Various circuit breakers and switches, such as breaker 182, stator sync switch 158, etc. can be included in the power generation unit 100 for isolating the various components as necessary for normal operation of DFIG 120 during connection to and disconnection from the power delivery point 184. In this manner, such components can be configured to connect or disconnect corresponding buses, for example, when current flow is excessive and can damage components of the power generation unit 100 or for other operational considerations. Additional protection components can also be included in the power generation unit 100. For example, as depicted in FIG. 1, a multiphase crowbar circuit 190 can be included to protect against an overvoltage condition damaging circuits of the power generation unit 100.

The power converter 162 can receive control signals from, for instance, the control system 176 via the control device 174. The control signals can be based, among other things, on sensed conditions or operating characteristics of the power generation unit 100. Typically, the control signals provide for control of the operation of the power converter 162. For example, feedback in the form of sensed speed of the DFIG 120 can be used to control the conversion of the output power from the rotor bus 156 to maintain a proper and balanced multiphase (e.g. three-phase) power supply. Other feedback from other sensors can also be used by the control device 174 to control the power converter 162, including, for example, stator and rotor bus voltages and current feedbacks. Using the various forms of feedback information, switching control signals (e.g. gate timing commands for switching devices), stator synchronizing control signals, and circuit breaker signals can be generated. In an embodiment, the control device 174 can be configured to sense a ground fault in a power converter 162 in the power generation system 100. For example, as will be discussed in greater detail below, one or more heatsinks in a power converter 162 can be electrically connected to a local ground formed by one or more components of the power generation unit. One or more sensors can be configured to sense a ground fault in the power converter, such as a ground fault due to an insulation failure, and can provide one or more signals indicative of a current between a power converter and a local ground to the control device 174. In an embodiment, the control device 174 can be configured to determine in which power converter 162 the ground fault occurred, and further can be configured to electrically isolate the power generation unit 100 in which the ground fault occurred.

Figure 2:
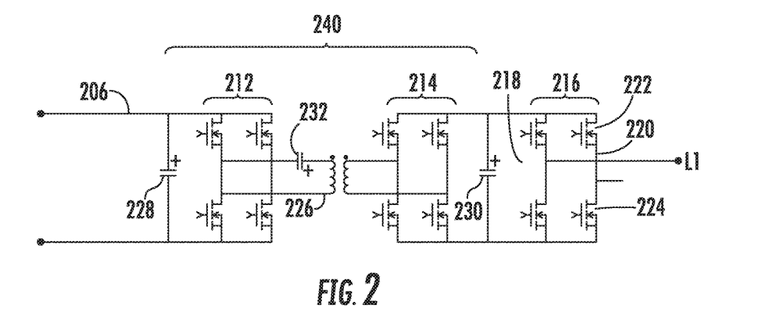
FIG. 2 depicts example elements for use in a power converter according to example aspects of the present disclosure.

Referring now to FIG. 2, a topology of a component in a DC to DC to AC converter is depicted. FIG. 2 depicts an example DC to DC to AC inverter block 206, which can be included in a conversion module 200 of a line side converter 168, as depicted in FIG. 3. Each inverter block 206 can include a plurality of conversion entities. For instance, inverter block 206 can include conversion entity 212, conversion entity 214, and conversion entity 216. Each conversion entity 212-216 can include a plurality of bridge circuits coupled in parallel. For instance, conversion entity 216 includes bridge circuit 218 and bridge circuit 220. As indicated, each bridge circuit can include a plurality of switching devices coupled in series. For instance, bridge circuit 220 includes an upper switching device 222 and a lower switching device 224. The switching devices can be SiC MOSFETs, which can be operated at higher switching frequencies than conventional IGBTs. As shown, inverter block 206 further includes an isolation transformer 226. The isolation transformer 226 can be coupled to conversion entity 212 and conversion entity 214. As shown, the inverter block 206 can further include capacitors 228 and 230.

First conversion entity 212, isolation transformer 226, and second conversion entity 214 can together define an inner converter 240. Inner converter 240 can be operated to convert a LV DC power from the DC link 126 to a second LV DC power bus at the outer converter. In an embodiment, inner converter 240 can be a high-frequency resonant converter. In a resonant converter configuration, a resonant capacitor 232 can be included in inner converter 240. In various embodiments, a resonant capacitor 232 can be included on a LV side of the isolation transformer 226 as depicted in FIG. 2, on an MV side of the isolation transformer 226 (not depicted), or on both the LV and MV sides of the isolation transformer 226 (not depicted). In another embodiment, inner converter 240 can be a hard-switched converter by removing the resonant capacitor 232. Third conversion entity 216 can also be referred to as an outer converter 216. Outer converter 216 can convert a LV DC power from the inner converter to a LV AC power suitable for use on an energy grid 184. In a typical application, outer converter 216 can be a hard-switched converter, and therefore not include a resonant capacitor.

Figure 3:
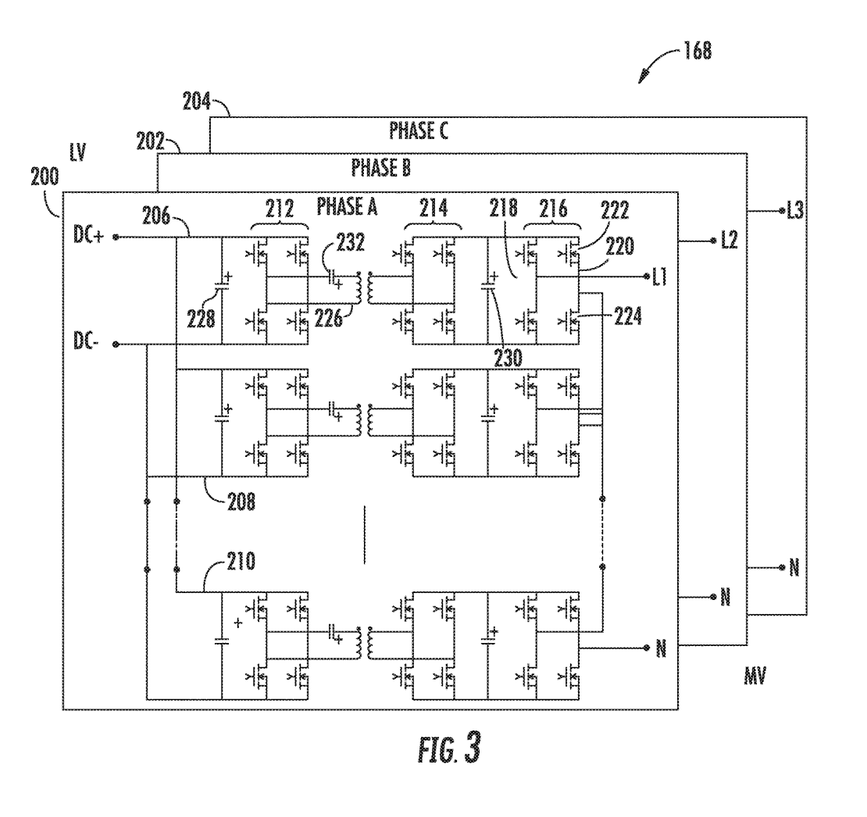
FIG. 3 depicts an power converter according to example aspects of the present disclosure.

FIG. 3 depicts an example line side converter 168 according to example embodiments of the present disclosure. As shown, the line side converter 168 includes conversion module 200, conversion module 202, and conversion module 204. The conversion modules 200-204 can be configured to receive a LV DC power from the rotor side converter 166, and to convert the LV DC power to a MV AC power for feeding to the power delivery point 184. Each conversion module 200-204 is associated with a single phase of three-phase output AC power. In particular, conversion module 200 is associated with the phase A output of the three-phase output power, conversion module 202 is associated with the phase B output of the three-phase output power, and conversion module 204 is associated with the phase C output of the three-phase output power.

Each conversion module 200-204 includes a plurality of inverter blocks 206-210. For instance, as shown, conversion module 200 includes inverter blocks 206, inverter block 208, and inverter block 210. In an embodiment, each conversion module 200-204 can include any number of inverter blocks 206-210. The line side converter 168 can be a bidirectional power converter. The line side converter 168 can be configured to convert a LV DC power to a MV AC power and vice versa. For instance, when providing power to the power delivery point 184, the line side converter 168 can be configured to receive a LV DC power from the DC link 126 on a LV side of the line side converter 168, and to output a MV AC power on a MV side of the line side converter 168. The inverter blocks 206-210 can be coupled together in parallel on the LV side and can be coupled together in series on the MV side.

In one particular example implementation, when providing power to the power delivery point 184, the conversion entity 212 can be configured to convert the LV DC on the DC link 126 to a LV AC power. The isolation transformer 226 can be configured to provide isolation. The conversion entity 214 can be configured to convert the LV AC power to a LV DC power. The conversion entity 216 can be configured to convert the LV DC power to a LV AC power suitable for provision to the power delivery point 184. A plurality of inverter blocks can be connected in series to build a MV AC voltage suitable for use on a MV AC energy grid.

The inverter blocks 206-210 can be configured to contribute to the overall MV AC power provided by the conversion module 200. In this manner, any suitable number of inverter blocks can be included within the conversion modules 200-204. As indicated, each conversion module 200-204 is associated with a single phase of output power. In this manner, the switching devices of the conversion modules 200-204 can be controlled using suitable gate timing commands (e.g. provided by one or more suitable driver circuits) to generate the appropriate phase of output power to be provided to the electrical grid. For example, the control device 174 can provide suitable gate timing commands to the gates of the switching devices of the bridge circuits. The gate timing commands can control the pulse width modulation of the SiC MOSFETs and/or IGBTs to provide a desired output.

It will be appreciated, that although FIG. 3 depicts only the line side converter 168, the rotor side converter 166 depicted in FIG. 2 can include the same or similar topology. In particular, the rotor side converter 166 can include a plurality of conversion modules having one or more conversion entities as described with reference to the line side converter 168. Further, it will be appreciated that the line side converter 168 and the rotor side converter 166 can include SiC MOSFETs, IGBT switching devices, and/or other suitable switching devices. In implementations wherein the rotor side converter 166 is implemented using SiC MOSFETs, the rotor side converter 166 can be coupled to a crowbar circuit (e.g. multiphase crowbar circuit 190) to protect the SiC MOSFETs from high rotor current during certain fault conditions.

Referring generally to FIGS. 1-3, the stator side, or MV side of a power generation system 100 may need a method of ground fault control to ensure the insulation system on the MV side is not damaged by a high voltage during faults. For example, if an insulation failure were to occur in a power converter 162, the power converter 162 may experience a ground fault, such as, for example, when an arc flash occurs between one or more components of the power converter 162 and a heatsink. If the power converter 162 is not properly grounded, the fault current in the power converter 162 may propagate to a cluster transformer, and a cluster protection scheme may trip the entire cluster offline.

Figure 4:
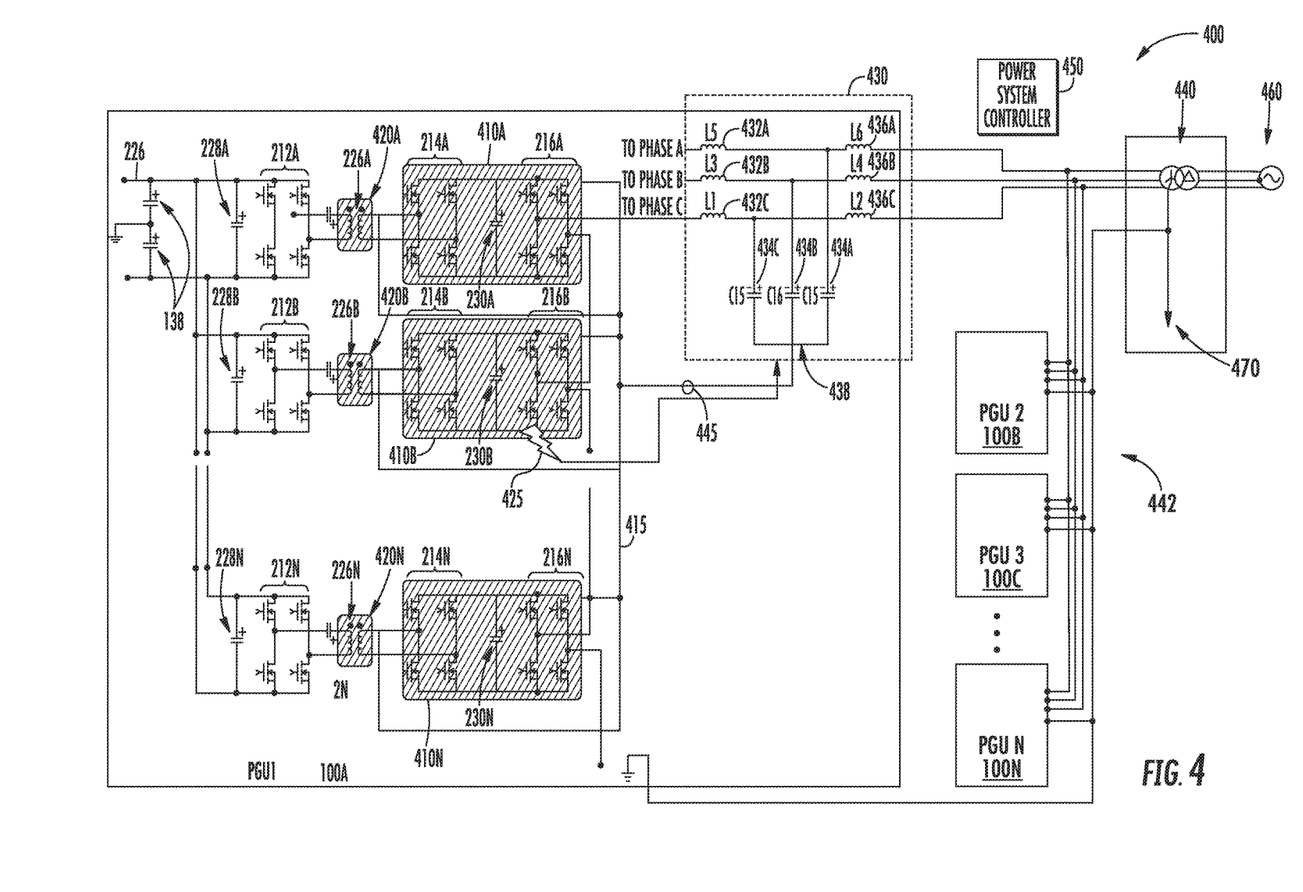
FIG. 4 depicts an example power generation system according to example aspects of the present disclosure.

Referring now to FIG. 4, a power generation system 400 according to example aspects of the present disclosure is depicted. Elements that are the same or similar to those in FIGS. 1-3 are referred to with the same reference numerals. As depicted in FIG. 4, a power generation system 400 can include a plurality of power generation units 100. For example, as shown in FIG. 4, the power generation system 400 includes a first power generation unit 100A, a second power generation unit 100B, a third power generation unit 100C, and a fourth power generation unit 100N. According to example aspects of the present disclosure, a power generation system 400 can include any number of power generation units 100. Each power generation unit 100 can include, for example, a DFIG power generator configured to generate multiphase AC power and a power converter, which can include one or more silicon carbide MOSFETs and at least one heatsink.

For example, a portion of a power generation unit 100A is depicted in FIG. 4, including a DC link 126, a DC link capacitor 138, and a plurality of DC to DC to AC inverter blocks, such as inverter blocks 206-210 depicted in FIGS. 2 and 3. Each power generation unit 100 can include other components, as described herein. Each DC to DC to AC inverter block can include capacitors 228 and 230, a conversion entity 212, a conversion entity 214, a conversion entity 216, and an isolation transformer 226, as described in FIGS. 2 and 3.

Each DC to DC to AC inverter block can include a converter heatsink 410 configured to remove heat from one or more components of the DC to DC to AC inverter block. For example, a converter heatsink 410 can be configured to remove heat from a conversion entity 214, a conversion entity 216, and a capacitor 230. A converter heatsink 410 can similarly be configured to remove heat from a DC to AC inverter in a DC to DC to AC inverter block, such as a conversion entity 216. Other converter heatsinks 410 can be included in a DC to DC to AC inverter block or a DC to AC inverter in a DC to DC to AC inverter block, such as any converter heatsink 410 configured to remove heat from the DC to DC to AC inverter block or DC to AC inverter. The converter heatsink 410 can be constructed from any suitable heat dissipating material. For example, metals such as copper, aluminum, and steel can be used for a heatsink 410. Compounds such as copper zinc (brass), aluminum silicon carbide (AlSiC), copper-tungsten, or aluminum magnesium can also be used for a heatsink 410. Further, some ceramic materials and diamond heatsinks can be used as well.

Additionally, each DC to DC to AC inverter block can include one or more transformer heatsinks configured to remove heat from an isolation transformer. For example, as depicted in FIG. 4, each DC to DC to AC inverter block can include a transformer heatsink 420 configured to remove heat from an isolation transformer 226. The transformer heatsink 420 can be, for example, a core of an isolation transformer 226. Other transformer heatsinks 420 can be included in an isolation transformer 226, such as any transformer heatsink 420 configured to remove heat from the isolation transformer 226. The transformer heatsink 420 can be constructed from any suitable heat dissipating material. For example, metals such as copper, aluminum, and steel can be used for a heatsink 420. Compounds such as copper zinc (brass), aluminum silicon carbide (AlSiC), copper-tungsten, or aluminum magnesium can also be used for a heatsink 420. Further, some ceramic materials and diamond heatsinks can be used as well.

In an embodiment, the converter heatsinks 410 and transformer heatsinks 420 can be electrically connected to a local ground formed by one or more components of the power generation system. For example, the converter heatsinks 410 and transformer heatsinks 420 can be electrically connected to a neutral node 438 formed by the capacitors of a multiphase filter 430. The converter heatsinks 410 and transformer heatsinks 420 can be electrically connected to one or more grounding conductors 415. The grounding conductors 415 can be, for example, a conductor configured to conduct a ground fault current to a local ground. For example, as depicted in FIG. 4, converter heatsinks 410A, 410B, 410N and transformer heatsinks 420A, 420B, and 420N are all connected by grounding conductors 415 to a neutral node 438, as will be discussed in greater detail below. As depicted in FIG. 4, a ground fault 425 may occur in a power converter 162, such as in a DC to DC to AC inverter block of a line side converter 166. The ground fault 425 can be due to, for example, an insulation failure in one of the SiC MOSFETs or other components of the DC to DC to AC inverter block. In the event that a power converter 162 experiences a ground fault, such as a ground fault 425 illustrated in FIG. 4, the grounding conductors 415 can carry the current from the ground fault 425 to a local ground, such as a neutral node 438.

The power generation system can further include a multiphase filter 430. For example, as depicted in FIG. 4, each phase of a multiphase output from a power converter 162 can be filtered by a multiphase filter 430. Each phase of a multiphase filter 430 can include one or more inductors and a capacitor. For example, as depicted in FIG. 4, each phase of a multiphase filter 430 includes a first inductor 432, a second inductor 436, and a capacitor 434. In an embodiment, the filter capacitors 434 from each phase of a multiphase filter 430 can be electrically connected to form a neutral node 438. For example, as shown in FIG. 4, the neutrals of filter capacitor 434A, filter capacitor 434B, and filter capacitor 434C are all connected together to form a single node, which is a neutral node 438. The neutral node 438 can be at a reference or non-zero voltage. The neutral node 438 can be electrically connected to the one or more grounding conductors 415, and further, to converter heatsinks 410 and transformer heatsinks 420, thereby allowing a ground fault occurring in a power converter 162 to be grounded to the neutral node 438.

The power generation system 400 can further include a cluster transformer 440. The cluster transformer 440 can be, for example, a neutral forming cluster transformer, such as a transformer in a star or zigzag configuration. In an embodiment, the cluster transformer 440 can be electrically connected to a transformer ground 470. For example, the transformer ground 470 can be a solid earth ground, which can be electrically connected to the neutral of the cluster transformer 440. In an embodiment, a high impedance resistor (not depicted) can be electrically connected between the cluster transformer 440 and the transformer ground 470. For example, a high impedance resistor can be a resistor selected to carry a leakage current or ground fault current associated with the cluster transformer 440. In such a configuration, the cluster transformer 440 can be electrically connected to the transformer ground 470 through the high impedance resistor.

The cluster transformer 440 can be connected to each power generation unit 100 through a cluster network 442. The cluster network 442 can be, for example, a plurality of conductors configured to receive a power output from each power converter in a power generation unit 100, and further configured to transmit the power from each power generation unit 100 to the cluster transformer 440. The cluster transformer 440 can be electrically connected to the plurality of power generation units 100 in the power generation system 400 by electrically connecting to the cluster network 442, and can be configured to convert the power from each power generation unit from a first form of power to a second form of power. For example, the cluster transformer can be a three winding transformer configured to convert the MV power from a cluster of DFIGs into a high voltage ("HV") power suitable for transmission over an electric grid transmission system. The cluster transformer can further be configured to provide the converted power (i.e., the second power), such as HV power, to an energy grid 460. Energy grid 460 can be, for example, a multiphase (e.g., three phase) electric transmission grid. In one or more embodiments, the cluster network 442 can be configured to carry single phase power or multiphase power (e.g., three phase power) from the power generation units 100.

Power generation system 400 can further include a power system control device 450. Power system control device 450 can be, for example, a computing device or other control device configured to monitor one or more characteristics of the power generation system 400, and further can be configured to control various components of the power generation system 400. For example, a power system control device 450 can be configured to determine when a ground fault has occurred in a power converter 162 in the power generation system 400.

For example, a power system control device 450 can be communicatively coupled to one or more sensors throughout the power generation system 400. For example, a ground fault current sensor 445 can be configured to sense a current in a grounding wire 415. In an embodiment, the ground fault sensor 445 can further be configured to sense a direction of a ground fault current. The ground fault sensor 445 can be, for example, connected to one or more grounding conductors 415 between a neutral node 438 and one or more converter heatsinks 410 and transformer heatsinks 420. The ground fault sensor 445 can provide one or more signals to a power system control device 450 indicative of a current between a power converter and a local ground, such as a current measurement and/or current direction. The power system control device 450 can be configured to determine that a ground fault has occurred in the power generation system 400 based at least in part on one or more signals from the ground fault sensor(s) 445.

In an embodiment, the power system control device 450 can be configured to determine in which power generation unit 100 in a power generation system 400 a ground fault has occurred. For example, a power system control device 450 can be coupled to a plurality of ground fault sensors 445 throughout a power generation system 400, such as one or more ground fault sensors 445 in each power generation unit 100. If a current sensed by a ground fault sensor 445 exceeds a threshold, such as a threshold associated with a ground fault, the power system control device 450 can identify a faulted power generation unit, such as a power generation unit in which the current between a power converter and a local ground exceeds the threshold. Further, using a plurality of signals from the plurality of ground fault sensors 445, the power system control device 450 can be configured to determine in which direction a ground fault current is flowing in the power generation system 400. By comparing the ground fault current directions in the different power generation units 100, the power system control device 450 can be configured to identify a ground fault associated with a faulted power generation unit. For example, if a ground fault current is flowing from one or more power generation units 100 into a particular power generation unit 100, the power system control device 450 can be configured to determine a faulted power generation unit based on the ground fault current flows.

In an embodiment, power system control device 450 can further be configured to electrically isolate the faulted power generation unit. For example, a power system control device 450 can be configured to shut down a faulted power converter 162, open one or more switches (not shown), or perform other control actions to electrically isolate the faulted power generation unit. In so doing, the power system control device 450 can prevent a ground fault from propagating to a cluster transformer, thereby allowing unaffected power generation units 100 to continue producing power.

While power system control device 450 is depicted as a single control device configured to monitor the power generation system 400, one of ordinary skill in the art will recognize that the power system control device 450 and its associated functions can be performed by a plurality of control devices, such as control devices 174 in each power generation unit. For example, a power generation system 400 can include a distributed control scheme, wherein each power generation unit 100 includes a control device 174 configured to perform one or more functions of the power system control device 450. Further, in a distributed control scheme, each control device 174 can be configured to communicate with a network and/or other control devices 174.

Figure 5:
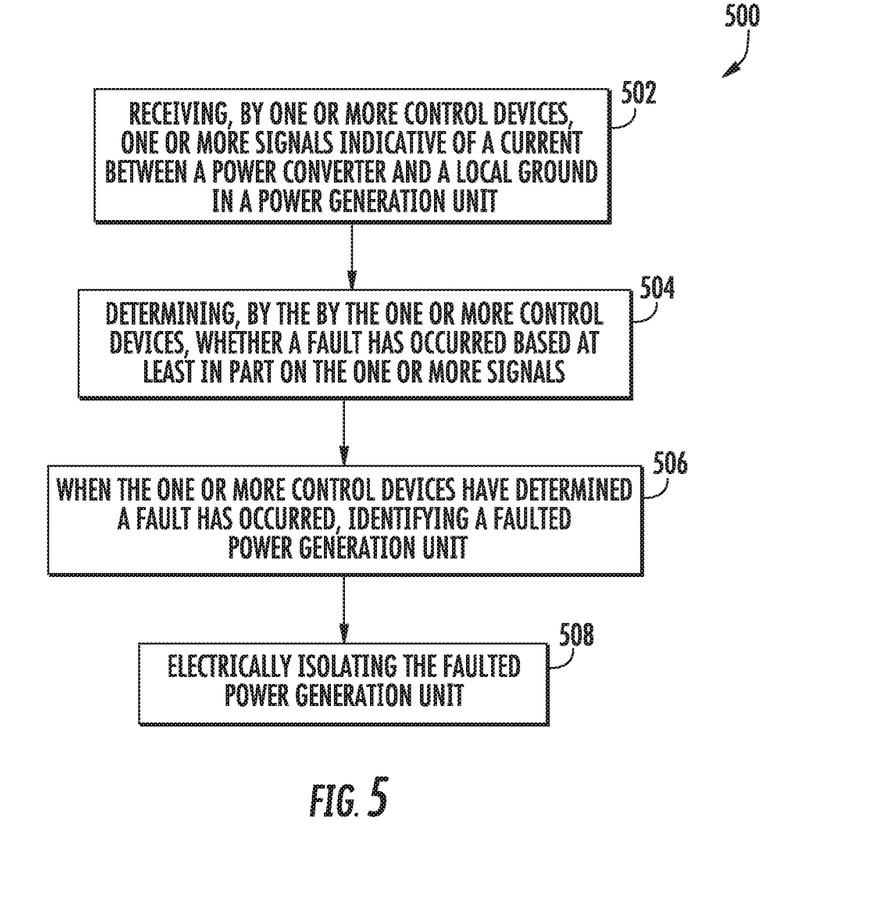
FIG. 5 depicts an example method according to example aspects of the present disclosure.

Referring now to FIG. 5, a method (500) for isolating a ground fault in a power generation system according to example aspects of the present disclosure is depicted. A power generation system can include a plurality of power generation units, wherein each power generation unit includes a power generator, such as a DFIG 120, and a power converter, such as a power converter 162. The power generator can be configured to generate multiphase alternating current power at a first voltage, and the power converter can be configured to convert the multiphase alternating current power at the first voltage to multiphase alternating current power at a second voltage. Each power converter can include one or more SiC MOSFETs and at least one heatsink configured to remove heat from one or more components of the power converter. The at least one heatsink can be electrically connected to a local ground formed by one or more components of the power generation unit.

At (502), the method (500) can include receiving, by one or more control devices, one or more signals indicative of a current between a power converter and a local ground in a power generation unit from one or more sensor sin the power generation system. For example, a ground fault current sensor 445 can be configured to sense a current and current direction in a grounding conductor 415 connected to a converter heatsink 410 or transformer heatsink 420 and a neutral node 438. The ground fault sensor 445 can be configured to send one or more signals indicative of a current to a control device, such as a control device 174 or power system control device 450. The control device 174/450 can receive the signals from the ground fault sensor 445.

At (504), the method (500) can include determining, by the one or more control devices, whether a fault has occurred based at least in part on the one or more signals indicative of a current between the power converter and the local ground in a power generation unit. For example, a control device 174/450 can be configured to determine that a ground fault has occurred if a current between the power converter and the local ground exceeds a threshold, such as a zero current threshold. Other thresholds can similarly be used. The control device 174/450 can be configured to determine that a ground fault has occurred based on the one or more signals, such as when the current exceeds the threshold.

When the one or more control devices have determined that a fault has occurred, at (506), the one or more control devices can identify a faulted power generation unit. For example, a control device 174/450 can determine that a power generation unit 100 in which a current from a power converter 162 to a neutral node 438 exceeds a threshold is a faulted power generation unit. The control device 174/450 can select the power generation unit in which the current between the power converter and the local ground exceeds the threshold as the faulted power generation unit. Further, the controller 174/450 can determine a direction of a ground fault current based at least in part on the one or more signals indicative of current from a ground fault sensor 445. For example, a control device 174/450 can be coupled to a plurality of ground fault sensors 445 throughout a power generation system 400, such as one or more ground fault sensors 445 in each power generation unit 100. Using one or more signals from the plurality of ground fault sensors 445, control device 174/450 can be configured to determine in which direction a ground fault is flowing. By comparing the ground fault current directions in the different power generation units 100, the power system control device 450 can be configured to isolate the ground fault to a particular power generation unit 100. For example, if a ground fault current is flowing from one or more power generation units 100 into a particular power generation unit 100, the power system control device 450 can be configured to determine a faulted power generation unit based on the ground fault currents.

At (508), the method (500) can include electrically isolating the faulted power generation unit. For example, a control device 174/450 can be configured to shut down a faulted power converter 162, open one or more switches, or perform other control actions to electrically isolate the faulted power generation unit. In so doing, the power system control device 450 can prevent a ground fault from propagating to a cluster transformer, thereby allowing unaffected power generation units 100 to continue producing power.

Figure 6:
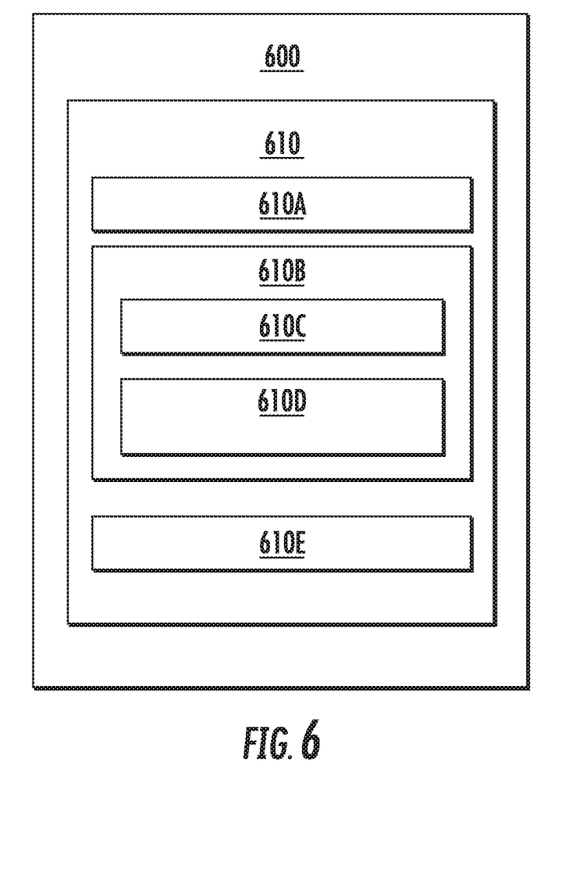
FIG. 6 depicts elements suitable for use in a control device according to example aspects of the present disclosure.

FIG. 6 depicts an example computing system 600 according to example embodiments of the present disclosure. The computing system 600 can be used, for example, as a control device 174 or a power system control device 450 in a power generation system 400. The computing system 600 can include one or more computing device(s) 610. The computing device(s) 610 can include one or more processor(s) 610A and one or more memory device(s) 610B. The one or more processor(s) 610A can include any suitable processing device, such as a microprocessor, microcontrol device, integrated circuit, logic device, and/or other suitable processing device. The one or more memory device(s) 610B can include one or more computer-readable media, including, but not limited to, non-transitory computer-readable media, RAM, ROM, hard drives, flash drives, and/or other memory devices.

The one or more memory device(s) 610B can store information accessible by the one or more processor(s) 610A, including computer-readable instructions 610C that can be executed by the one or more processor(s) 610A. The instructions 610C can be any set of instructions that when executed by the one or more processor(s) 610A, cause the one or more processor(s) 610A to perform operations. In some embodiments, the instructions 610C can be executed by the one or more processor(s) 610A to cause the one or more processor(s) 610A to perform operations, such as any of the operations and functions for which the computing system 600 and/or the computing device(s) 610 are configured, the operations for isolating a ground fault in a power generation system (e.g., method 500), as described herein, and/or any other operations or functions of the one or more computing device(s) 610. The instructions 610C can be software written in any suitable programming language or can be implemented in hardware. Additionally, and/or alternatively, the instructions 610C can be executed in logically and/or virtually separate threads on processor(s) 610A. The memory device(s) 610B can further store data 610D that can be accessed by the processor(s) 610A. For example, the data 610D can include data indicative of power flows, current flows, actual voltages, ground fault currents, nominal voltages, and/or any other data and/or information described herein.

The computing device(s) 610 can also include a network interface 610E used to communicate, for example, with the other components of system 600 (e.g., via a network). The network interface 610E can include any suitable components for interfacing with one or more network(s), including for example, transmitters, receivers, ports, control devices, antennas, and/or other suitable components. For example, the network interface 610E can be configured to communicate with one or more sensors in a power generation system 400, such as one or more ground fault current sensors 445.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The present disclosure is discussed with reference to DFIG power generation systems including a power converter utilizing silicon carbide MOSFETs for purposes of illustration and discussion. Those of ordinary skill in the art, using the disclosures provided herein, will understand that other power generation systems and/or topologies can benefit from example aspects of the present disclosure. For instance, the grounding and protection schemes disclosed herein can be used in a wind, solar, gas turbine, or other suitable power generation system. Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A power generation unit, comprising:
   a power generator configured to generate multiphase alternating current power at a first voltage; and
   a power converter configured to convert the multiphase alternating current power from the power generator at the first voltage to multiphase alternating current power at a second voltage, the power converter comprising one or more silicon carbide MOSFETs and at least one heatsink configured to remove heat from the power converter; and
   wherein the at least one heatsink of the power converter is electrically connected to a local ground formed by one or more components of the power generation unit, said local ground being specific to the power generation unit.

2. The power generation unit of claim 1, further comprising:
   one or more control devices configured to detect a ground fault in the power converter.

3. The power generation unit of claim 2, further comprising:
   one or more grounding conductors, wherein the at least one heatsink of the power converter is electrically connected to the local ground by the one or more grounding conductors; and
   wherein the one or more control devices are configured to detect a ground fault in the power converter by sensing a current in the one or more grounding conductors.

4. The power generation unit of claim 2, wherein the one or more control devices are further configured to electrically isolate the power generation unit when a ground fault is detected in the power converter.

5. The power generation unit of claim 1, further comprising a multiphase filter configured to filter a multiphase power output of the power converter.

6. The power generation unit of claim 5, wherein the multiphase filter comprises at least one inductor and at least one capacitor for each phase of the multiphase power output from the power converter.

7. The power generation unit of claim 6, wherein the capacitor for each phase of the multiphase filter is electrically connected to form a neutral node; and
   wherein the at least one heatsink of the power converter is electrically connected to a local ground formed by one or more components of the power generation unit by electrically connecting the at least one heatsink of the power converter to the neutral node.

8. The power generation unit of claim 1, wherein the power converter comprises a plurality of DC to DC to AC inverter blocks.

9. The power generation unit of claim 7, wherein each DC to DC to AC inverter block comprises an isolation transformer, wherein each isolation transformer comprises a transformer heatsink; and wherein the at least one heatsink of the power converter is electrically connected to a local ground formed by one or more components of the power generation unit by electrically connecting the transformer heatsink to the local ground.

10. The power generation system of claim 9, wherein each DC to DC to AC inverter block further comprises a first conversion entity configured to convert DC power to AC power, a second conversion entity configured to convert AC power to DC power, and a third conversion entity configured to convert DC power to AC power;
   wherein the isolation transformer is coupled between the first conversion entity and the second conversion entity;
   wherein the second conversion entity and the third conversion entity comprise a converter heatsink; and
   wherein the at least one heatsink of the power converter is electrically connected to a local ground formed by one or more components of the power generation unit by electrically connecting the converter heatsink to the local ground.

11. The power generation system of claim 1, wherein the power generator comprises a doubly fed induction generator.

12. A method of isolating a ground fault in a power generation system, the power generation system comprising a plurality of power generation units, each power generation unit comprising a power generator configured to generate multiphase alternating current power at a first voltage and a power converter configured to convert the multiphase alternating current power from the power generator at the first voltage to multiphase alternating current power at a second voltage, each power converter comprising one or more silicon carbide MOSFETs and at least one heatsink configured to remove heat from the power converter, the at least one heatsink of each power converter electrically connected to a local ground formed by one or more components of the power generation unit and said local ground being specific to the power generation unit, the method comprising:
   receiving, by one or more control devices, one or more signals indicative of a current between a power converter and a local ground in a power generation unit from one or more sensors in the power generation system;
   determining, by the one or more control devices, whether a fault has occurred based at least in part on the one or more signals indicative of a current between the power converter and the local ground in a power generation unit;
   when the one or more control devices have determined a fault has occurred, identifying a faulted power generation unit; and
   electrically isolating the faulted power generation unit.

13. The method of claim 12, wherein determining whether a fault has occurred comprises determining whether the current between the at least one power converter and the at least one local ground exceeds a threshold.

14. The method of claim 13, wherein identifying a faulted power generation unit comprises selecting the power generation unit in which the current between the power converter and the local ground exceeds the threshold.

15. The method of claim 12, wherein each power generation unit further comprises a multiphase filter configured to filter a multiphase power output from the power converter in the power generation unit;
   wherein each multiphase filter comprises at least one inductor and at least one capacitor for each phase of the multiphase power output from the power converter in the power generation unit;
   wherein the capacitors for each phase of the multiphase filter of a power generation unit are electrically connected to form a neutral node for the power generation unit; and
   wherein the at least one heatsink of each power converter is electrically connected to a local ground formed by one or more components of the power generation unit by electrically connecting the at least one heatsink of each power converter to the neutral node for the power generation unit.

16. The method of claim 15, wherein each power generation unit further comprises one or more grounding conductors;
   wherein the at least one heatsink of each power converter is electrically connected to the neutral node for the power generation unit by the one or more grounding conductors; and
   wherein the one or more signals indicative of a current between a power converter and a local ground in a power generation unit comprise one or more signals indicative of a current in the one or more grounding conductors.

17. A power generation system, comprising: a plurality of power generation units; and
   one or more control devices;
   wherein each power generation unit comprises:
   a power generator configured to generate multiphase alternating current power at a first voltage; and
   a power converter configured to convert the multiphase alternating current power from the power generator at the first voltage to multiphase alternating current power at a second voltage, the power converter comprising one or more silicon carbide MOSFETs and at least one heatsink configured to remove heat from the power converter; the at least one heatsink of each power converter electrically connected to a local ground formed by one or more components of the power generation unit, said local ground being specific to the power generation unit; and
   wherein the one or more control devices are configured to determine when a ground fault has occurred in a power converter in the power generation system based at least in part on a current from the at least one heatsink to the local ground in a power generation unit.

18. The power generation system of claim 17, wherein each power generation unit further comprises a multiphase filter configured to filter a multiphase power output from the power converter in the power generation unit;
   wherein each multiphase filter comprises at least one inductor and at least one capacitor for each phase of the multiphase power output from the power converter in the power generation unit;
   wherein the capacitors for each phase of the multiphase filter of a power generation unit are electrically connected to form a neutral node for the power generation unit; and
   wherein the at least one heatsink of each power converter is electrically connected to a local ground formed by one or more components of the power generation unit by electrically connecting the at least one heatsink of each power converter to the neutral node for the power generation unit.

19. The power generation system of claim 17, wherein the one or more control devices are configured to determine a faulted power generation unit when a ground fault has occurred in a power converter in the power generation system; and wherein the one or more control devices are further configured to electrically isolate the faulted power generation unit.

20. The power generation system of claim 17, further comprising: a cluster transformer;
   wherein the cluster transformer is electrically connected to the plurality of power generation units; and
   wherein the cluster transformer is configured to convert power from the plurality of power generation units from a first form of power to a second form of power.

* * * * *